United States Patent
Zhu et al.

(10) Patent No.: US 12,552,700 B2
(45) Date of Patent: Feb. 17, 2026

(54) METHOD, DEVICE, AND SYSTEM FOR GLASS BENDING

(71) Applicant: SAINT-GOBAIN GLASS FRANCE, Courbevoie (FR)

(72) Inventors: Jia Zhu, Shanghai (CN); Bernard Nghiem, Shanghai (CN); Zhiyi Wang, Shanghai (CN); Romain Decourcelle, Shanghai (CN)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 569 days.

(21) Appl. No.: 17/763,997

(22) PCT Filed: Sep. 24, 2020

(86) PCT No.: PCT/CN2020/117404
§ 371 (c)(1),
(2) Date: Mar. 25, 2022

(87) PCT Pub. No.: WO2021/057843
PCT Pub. Date: Apr. 1, 2021

(65) Prior Publication Data
US 2022/0348491 A1 Nov. 3, 2022

(30) Foreign Application Priority Data

Sep. 26, 2019 (CN) .......................... 201910918569.9

(51) Int. Cl.
*C03B 23/03* (2006.01)
*C03B 23/033* (2006.01)
*G06F 30/27* (2020.01)

(52) U.S. Cl.
CPC ............ *C03B 23/03* (2013.01); *C03B 23/033* (2013.01); *G06F 30/27* (2020.01); *C03B 2225/02* (2013.01)

(58) Field of Classification Search
CPC .................................. C03B 9/41; G01B 11/24
See application file for complete search history.

(56) References Cited

U.S. PATENT DOCUMENTS 3,744,985 A * 7/1973 Peternel .................. C03B 29/10
65/106
3,839,000 A * 10/1974 Peternel .............. C03B 23/0302
65/273

(Continued)

FOREIGN PATENT DOCUMENTS

CN 202966923 U 6/2013
CN 104843981 A 8/2015

(Continued)

OTHER PUBLICATIONS

International Search Report as issued in International Patent Application No. PCT/CN2020/117404, dated Dec. 23, 2020.

(Continued)

*Primary Examiner* — Erin Snelting
*Assistant Examiner* — Steven S Lee
(74) *Attorney, Agent, or Firm* — Pillsbury Winthrop Shaw Pittman LLP

(57) ABSTRACT

The computer-implemented method for glass bending includes obtaining a deviation of a real shape of a glass from a desired shape of the glass, the glass is produced by a glass bending process; determining a variation of at least one parameter associated with the glass bending process, at least in part based on the deviation of the real shape from the desired shape; and adjusting the at least one parameter based on the variation for compensation of the deviation.

9 Claims, 4 Drawing Sheets

(56) References Cited

U.S. PATENT DOCUMENTS

| | | | |
|---|---|---|---|
| 4,300,935 A | | 11/1981 | Seymour |
| 4,361,428 A | * | 11/1982 | Bartusel .................. G05D 23/27 |
| | | | 65/118 |
| 4,915,722 A | * | 4/1990 | Havenith ............ C03B 23/0307 |
| | | | 65/273 |
| 4,939,918 A | * | 7/1990 | Schoch ............... B30B 15/0094 |
| | | | 72/453.13 |
| 5,716,425 A | * | 2/1998 | Wolfe ..................... C03B 23/03 |
| | | | 65/29.1 |
| 6,571,589 B1 | * | 6/2003 | Ito ............................ B21D 5/02 |
| | | | 72/31.11 |
| 2003/0154746 A1 | * | 8/2003 | Lammi ................. C03B 35/202 |
| | | | 65/273 |
| 2004/0236447 A1 | | 11/2004 | Yoshimitsu et al. |
| 2005/0200859 A1 | * | 9/2005 | Hazart ................... G01B 11/24 |
| | | | 703/2 |
| 2006/0218984 A1 | * | 10/2006 | Heller ...................... B21D 5/01 |
| | | | 72/31.1 |
| 2007/0258156 A1 | | 11/2007 | Wang et al. |
| 2008/0060386 A1 | * | 3/2008 | Kanno ................. C03B 35/165 |
| | | | 65/289 |
| 2009/0084138 A1 | * | 4/2009 | Imaichi ............... C03B 23/0357 |
| | | | 65/106 |
| 2012/0297828 A1 | * | 11/2012 | Bailey ................. C03B 23/0258 |
| | | | 165/172 |
| 2014/0331716 A1 | * | 11/2014 | Ahmed .................... H05K 5/03 |
| | | | 703/1 |
| 2014/0331781 A1 | | 11/2014 | Lee et al. |
| 2015/0107302 A1 | * | 4/2015 | Kellner ..................... C03B 9/41 |
| | | | 65/29.11 |
| 2015/0344346 A1 | * | 12/2015 | Jiao ......................... C03B 25/08 |
| | | | 65/29.11 |
| 2016/0167894 A1 | * | 6/2016 | Morris ................. B65G 47/905 |
| | | | 414/800 |
| 2016/0288184 A1 | * | 10/2016 | Zhao ........................ B21D 5/02 |
| 2017/0081238 A1 | * | 3/2017 | Jones ................. C03B 23/0235 |

FOREIGN PATENT DOCUMENTS

| | | | | |
|---|---|---|---|---|
| CN | 108563195 A | * | 9/2018 | |
| CN | 109133598 A | | 1/2019 | |
| DE | 202007002965 U1 | * | 5/2008 | .............. B21D 1/10 |
| JP | 2005161332 A | * | 6/2005 | |
| WO | WO 2017/176634 A1 | | 10/2017 | |

OTHER PUBLICATIONS

First Office Action as issued in Chinese Patent Application No. 201910918569.9, dated Sep. 21, 2024.

* cited by examiner

METHOD, DEVICE, AND SYSTEM FOR GLASS BENDING

CROSS-REFERENCE TO RELATED APPLICATIONS

This application is the U.S. National Stage of PCT/CN2020/117404, filed Sep. 24, 2020, which in turn claims priority to Chinese patent application number 201910918569.9 filed Sep. 26, 2019. The content of these applications are incorporated herein by reference in their entireties.

FIELD

Embodiments of the present disclosure generally relate to the field of glass manufacturing, and more specifically, to glass bending, in particular glass bending for manufacturing vehicle glass.

BACKGROUND

Automotive manufacturers are requesting glass with tighter tolerances of their shapes, which requires the glass producer to control process parameters accurately; otherwise, the yield will be substantially decreased. Today, the adjustment of the glass shaping process is done mainly by experience of engineers or operators. Therefore, it particularly depends on the individual experience of engineers or operators. Moreover, even the best engineers or operators have difficulties to have an absolute control to the glass shaping process.

SUMMARY

The embodiments of the present disclosure provide a method, device and system for glass bending.

In a first aspect, there is provided a computer-implemented method for glass bending. The method comprises: obtaining a deviation of a real shape of a glass from a desired shape of the glass, the glass is produced by a glass bending process; determining a variation of at least one parameter associated with the bending process, at least in part based on the deviation of the real shape from the desired shape; and adjusting the at least one parameter based on the variation for compensation of the deviation.

In a second aspect, there is provided a computing device. The device comprises: a processing unit; and a memory coupled to the processing unit and comprising instructions stored therein, the instructions, when executed by the processing unit, cause the device to perform the method according to the first aspect.

In a third aspect, there is provided a system for manufacturing glass. The system comprises: a glass bending device configured to apply a glass bending process to the glass based on the at least one parameter; a measurement device configured to measure a deviation of a real shape of a glass from a desired shape of the glass; and the computing device according to the second aspect, the computing device configured to receive the deviation from the measurement device and provide the adjusted at least one parameter to the glass bending device.

In a fourth aspect, there is provided a computer readable storage medium storing computer executable instructions therein, the computer executable instructions, when executed by at least one processor, cause the at least one processor to perform the method according to the first aspect.

In a fifth aspect, there is provided a method for producing a glass, comprising: applying a glass bending process based on at least one parameter to the glass; measuring a deviation of a real shape of the glass from a desired shape of the glass; and determining the adjusted at least one parameter by the method according to the first aspect.

This Summary is not intended to identify key features or essential features of the present disclosure, nor is it intended to be used to limit the scope of the present disclosure. Other features of the present disclosure will be explained through the following description.

BRIEF DESCRIPTION OF THE DRAWINGS

Through the following detailed description on the example embodiments of the present disclosure with reference to the accompanying drawings, the above and other features, advantages and aspects of the present disclosure will become more apparent. The same reference symbols refer to the same components in the drawings where.

DETAILED DESCRIPTION OF EMBODIMENTS

Figure 1:
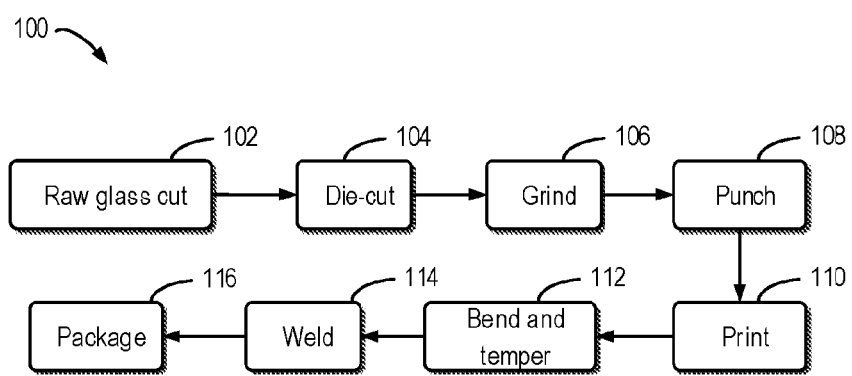
FIG. 1 illustrates a flowchart of a glass manufacturing process according to some embodiments of the present disclosure.

Through the following detailed description with reference to the accompanying drawings, the above and other features, advantages and aspects of the present disclosure will become more apparent. Throughout the drawings, the same or similar reference symbols refer to the same or similar elements.

Reference will now be made to various example embodiments as shown in the drawings to describe the conception of the present disclosure. It would be appreciated that description of those embodiments is only provided to enable those skilled in the art to better understand and further implement the present disclosure, without suggesting any limitation to the scope of the present disclosure. It is worth noting that the similar or same reference signs are used in the drawings if possible, which may represent the similar or same elements, respectively. As would be appreciated by those skilled in the art, the alternative embodiments of the structure and/or method as described herein can be applied to the following description, without departing from the principles and conception of the present disclosure.

As used herein, the term "includes" and its variants are to be read as open-ended terms that mean "includes, but is not limited to." The term "based on" is to be read as "based at least in part on." The term "an embodiment" is to be read as "at least one example embodiment." The term "another embodiment" is to be read as "at least one other embodiment." Other terms probably involved but not mentioned herein should not be construed or defined in a way contrary to the basic conception of the embodiments of the present disclosure unless the context clearly indicates otherwise.

FIG. 1 illustrates a flowchart of a glass manufacturing process 100 according to some embodiments of the present disclosure. The glass manufacturing process 100 is particularly applied to manufacture of vehicle glass. Although some specific steps are described herein, it would be appreciated that those skilled in the art may incorporate one or more steps therein, remove one or more steps therefrom, replace one or more steps with another one or more steps, or the like.

At block 102, a raw glass is cut to obtain a glass of a desired size. Generally, the two-dimensional shape of the cut glass will not match the desired shape. At block 104, the glass is die-cut to obtain a glass having a two-dimensional shape substantially meeting the requirement. At block 106, the die-cut glass is ground to remove sharp edges. At block 108, the glass is punched such that one or more holes are formed therein for use. At block 110, functional or identification components, such as an antenna, trademark or the like is printed on the glass. At block 112, the glass is subjected to a bending process, and the bent glass is tempered. At block 114, various connectors are welded onto the glass. At block 116, the glass is packaged.

The glass manufacturing process has been introduced briefly above, where the bending process performed at block 112 is important to determine whether the final glass product meets the shape requirement. However, the current adjustment to the glass forming process is heavily dependent on the experience of engineers or operators, making precise control impossible.

Figure 2:
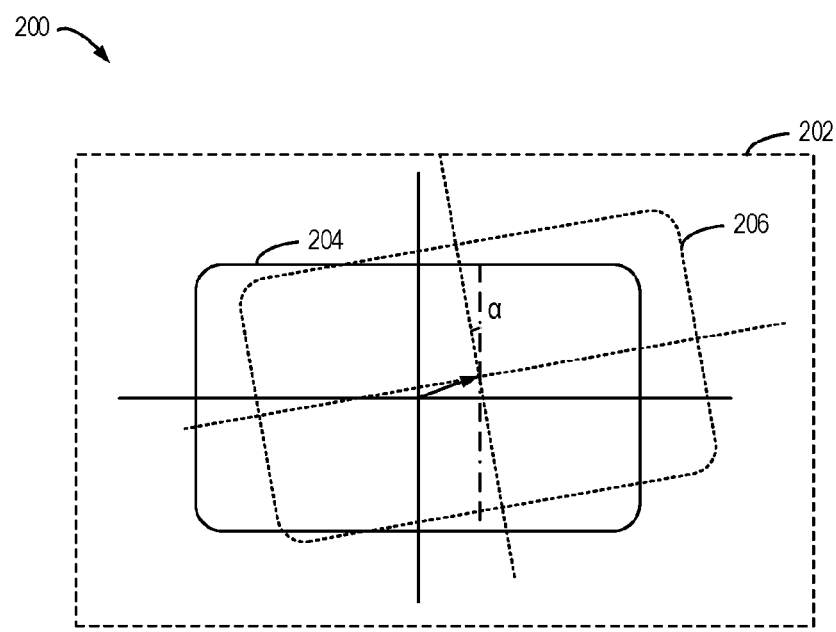
FIG. 2 illustrates a schematic diagram of a mathematical model according to some embodiments of the present disclosure.

Reference will be made to FIG. 2 in the following to introduce a mathematical model according to some embodiments of the present disclosure. FIG. 2 shows a basic framework 200 of the mathematical model, where 202 represents a glass bending device, 204 represents desired position parameters of glass, and 206 represents position parameters of a real shape of the glass. In the mathematical model, the process parameters and position parameters required in glass bending can be deduced from the final three-dimensional shape. For example, a real shape S of glass is a function of one or more glass bending parameters:

$$S_k = S_k(Q_1, Q_2, \ldots, Q_n)$$

where $S_k$ represents a real shape of glass, $Q_i$ (i=1 . . . n) represents parameters for controlling glass bending, including position parameter(s) when loading the glass and process parameter(s) of a thermal glass bending process, and k represents a location number of the glass measuring station.

In the glass forming process, a minor variation in the parameters may result in a deviation of the real shape of the glass from the desired shape, which may be expressed through the following mathematical equation:

$$M_k = S_k(Q_1 + \Delta Q_1, Q_2 + \Delta Q_2, \ldots, Q_n + \Delta Q_n) - S_k(Q_1, Q_2, \ldots, Q_n) + \quad (1)$$

$$a(\text{reference position})X_k + b(\text{reference position})Y_k + c(\text{reference position})$$

where, $M_k$ represents a deviation of a real shape of glass measured by a measuring device, such as a gauge, from a desired shape, including: a deviation $S_k(Q_1+\Delta Q_1, Q_2+\Delta Q_2, \ldots, Q_n+\Delta Q_n) - S_k(Q_1, Q_2, \ldots, Q_n)$ of the real shape of the glass product from the desired shape, and a correction term a(reference position)$X_k$+b(reference position)$Y_k$+c(reference position) generated by reference positions of studs when the glass is placed on the gauge. $\Delta Q_i$(i=1 . . . n) represents a variation of respective parameters, and $X_k$ and $Y_k$ represent position coordinates of a detection point k on the glass.

Given that the $\Delta Q_i$ variation is a minor variation in the manufacturing process, the Equation (1) may be linearized, i.e., $$M_k = \sum_i \frac{\partial S_k}{\partial Q_i} \Delta Q_i + a(\text{reference position})X_k + \quad (2)$$

$$b(\text{reference position})Y_k + c(\text{reference position})$$

In some particular embodiments, the glass shape deviation is mainly caused by position parameters during the manufacturing process. In these embodiments, $Q_i$ is specifically embodied as three parameters including: a rotation angle $\alpha$ of glass at an entrance of a heating furnace, a translation $\Delta X_t$ in the X direction of the glass, and a translation $\Delta Y_t$ in the Y direction of the glass. According to the Equation (1), the position measurement at $M_k$ may be expressed as follows:

$$M_k = S(X'_k, Y'_k) - S(X_k, Y_k) + a(\text{reference position})X_k +$$

$$b(\text{reference position})Y_k + c(\text{reference position}) + \varepsilon_k$$

where, $M_k$ represents a deviation from an ideal or desired position caused by the translations $\Delta X_t$, $\Delta Y_t$ and the rotation angle $\alpha$, and $X'_k$, $Y'_k$ represents coordinates obtained from coordinates $(X_k, Y_k)$ after the minor variation of the position parameters when loading the glass. It includes a sum of a deviation from the desired glass shape plus a correction depending on a stud position (i.e., the reference position), and a deviation $\varepsilon_k$ resulting from other process parameter (e.g., a tempering air pressure).

According to the principle as described in Equation (2), for a given point $M_k$, two variables, namely slopes of a mold surface in the X and the Y direction at the point $M_k$, may be defined as follows:

$$P_x^k = \frac{\partial S}{\partial x}(X_k, Y_k)$$

$$P_y^k = \frac{\partial S}{\partial y}(X_k, Y_k)$$

By expanding $S(X'_k, Y'_k) - S(X_k, Y_k)$ to a first order, the following may be obtained:

$$S(X'_k, Y'_k) - S(X_k, Y_k) \approx (X'_k - X_k)P_x^k + (Y'_k - Y_k)P_y^k \quad (3)$$

$$X'_k - X_k = \Delta X_t + X_k \cos\alpha - Y_k \sin\alpha - X_k \approx \Delta X_t - Y_k \alpha$$

$$Y'_k - Y_k = \Delta Y_t + Y_k \cos\alpha + X_k \sin\alpha - Y_k \approx \Delta Y_t + X_k \alpha$$

$$\Delta S_k \approx S(X'_k, Y'_k) - S(X_k, Y_k) = P_x^k(\Delta X_t - Y_k \alpha) + P_y^k(\Delta Y_t + X_k \alpha)$$

$$A_k = A(X_k, Y_k) = P_y^k X_k - P_x^k Y_k$$

$$\Delta S_k \approx A_k \alpha + P_x^k \Delta X_t + P_y^k \Delta Y_t$$

$M_{S_j}$ represents three reference points or stud points (j=1, 2,3). Assumed that the glass is sufficiently rigid, only three equilibrium points are included. The equation for defining a stud plane is defined below:

$$\forall j \in \{1, 2, 3\} \Delta S_{s_j} + a X_{s_j} + b Y_{s_j} + c = 0$$

By solving the above equation, a, b and c can be obtained. It should be noted that these coefficients are respective functions of ($X_{S_j}$, $Y_{S_j}$, $\alpha$, $\Delta X_t$, $\Delta Y_t$). Thus, it can be reformulated as follows:

$$M = \begin{bmatrix} X_{s_1} & Y_{s_1} & 1 \\ X_{s_2} & Y_{s_2} & 1 \\ X_{s_3} & Y_{s_3} & 1 \end{bmatrix} \quad (4)$$

$$L = \begin{bmatrix} A_{s_1} & P_x^{s_1} & P_y^{s_1} \\ A_{s_2} & P_x^{s_2} & P_y^{s_2} \\ A_{s_3} & P_x^{s_3} & P_y^{s_3} \end{bmatrix}$$

$$\begin{bmatrix} a \\ b \\ c \end{bmatrix}(X_{S_j}, Y_{S_j}, \alpha, \Delta X_t, \Delta Y_t) = -M^{-1} S L \begin{bmatrix} \alpha \\ \Delta X_t \\ \Delta Y_t \end{bmatrix} = T \begin{bmatrix} \alpha \\ \Delta X_t \\ \Delta Y_t \end{bmatrix}$$

The T matrix depends on the positions of the stud and slopes of the mold surface at these positions.

$$M_k(X_{s_j}, Y_{s_j}, \alpha, \Delta X_t, \Delta Y_t) = \quad (5)$$

$$(A_k \alpha + P_x^k \Delta X_t + P_y^k \Delta Y_t) + X_k(t_{11}\alpha + t_{12}\Delta X_t + t_{13}\Delta Y_t) +$$

$$Y_k(t_{21}\alpha + t_{22}\Delta X_t + t_{23}\Delta Y_t) + (t_{31}\alpha + t_{32}\Delta X_t + t_{33}\Delta Y_t)$$

$$M_k(X_{s_j}, Y_{s_j}, \alpha, \Delta X_t, \Delta Y_t) = (A_k + X_k t_{11} + Y_k t_{21} + t_{31})\alpha +$$

$$(P_x^k + X_k t_{12} + Y_k t_{22} + t_{32})\Delta X_t + (P_y^k + X_k t_{13} + Y_k t_{23} + t_{33})\Delta Y_t + \varepsilon_k$$

The equation shows an affine function of the rotation angle $\alpha$, the X translation and the Y translation. More specifically, the mathematical model may be expressed by the following equation, where the contribution of each parameter is shown.

$$M_k = R_k \alpha + S_k \Delta X_t + V_k \Delta Y_t + \varepsilon_k \quad (6)$$

where, $R_k = A_k + X_k t_{11} + Y_k t_{21} + t_{31}$ represents coefficients associated with an effect of the rotation angle, $S_k = P_x^k + X_k t_{12} + Y_k t_{22} + t_{32}$ represents coefficients associated with an effect of the translation in the X direction, $V_k = P_y^k + X_k t_{13} + Y_k t_{23} + t_{33}$ represents coefficients associated with an effect of the translation in the Y direction, and $\varepsilon_k$ represents coefficients associated with other parameter and/or a model error.

Equations (4)-(6) may be applied to a glass manufacturing process for mold bending. In the application, the terms $R_k$, $S_k$ and $V_k$ in the Equation (6) may be computed using the position coordinates of respective measurement points of the glass, the position coordinates of the studs and the slop information at the mold surface. In the meantime, symmetry of the glass model can be used to make the computing simpler.

For a roller bending process, the general Equations (4)-(6) may be applied to the computing system, i.e., sensitivity of position measurement results to an entrance angle variation $\alpha$. Because the glass shape is not sensitive to the translations of the glass position during loading in the roller bending, the effect of the glass translations is neglected (i.e., $\Delta X_t = \Delta Y_t = 0$), and only the effect of the entrance angle variation is taken into account. In the application, computing $R_k$ in the Equation (6) is performed using information on position coordinates of respective measurement points of the glass, position coordinates of the studs, and a primary radius of the glass.

After these model coefficients are determined, an optimization function may be created to optimize manufacturing parameters. The optimization function may determine a set of new parameters to minimize the deviation of the real shape from the desired shape. For example, the optimization function may be referred to as $f_{opt}(M_k(\alpha), M_{k\_lim})$, where $M_{k\_lim}$ represents a tolerance requirement of the glass shape. If $M_k(\alpha, D)$ is small, $f_{opt}$ is also small, and if $|M_k(\alpha,D)| > M_{k\_lim}$, $f_{opt}$ approaches infinity. The new parameters determined by the optimization function will be used in the glass bending process.

Figure 3:
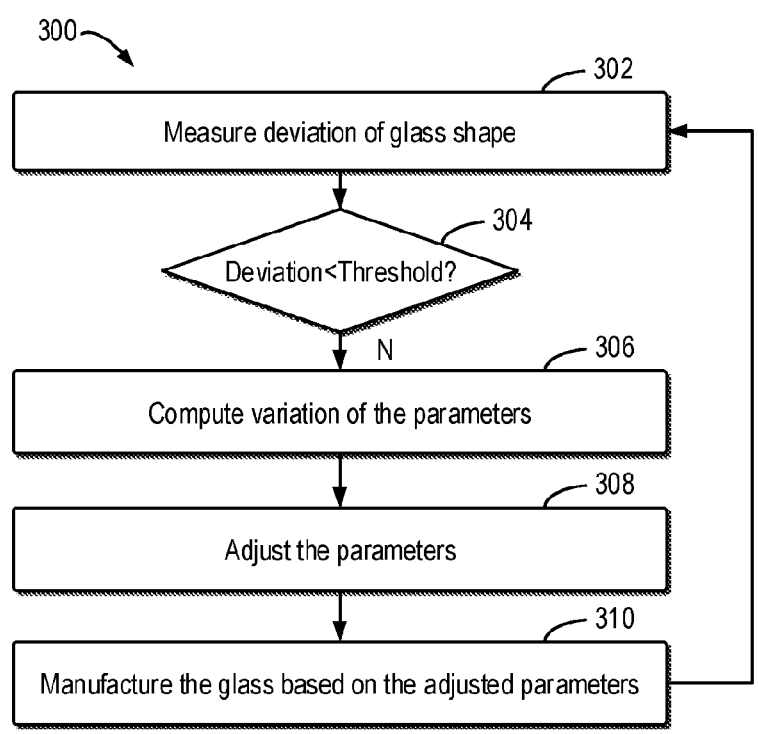
FIG. 3 illustrates a flowchart of a glass bending process according to some embodiments of the present disclosure.

FIG. 3 illustrates a flowchart of a method 300 for glass bending according to some embodiments of the present disclosure. At block 302, measuring a deviation of a real shape of the formed glass from a desired shape is implemented by various measurement devices (e.g., a gauge).

At block 304, it is determined whether the deviation is less than a threshold. If it is determined that the deviation is less than the threshold, which means that the shape of the glass meets the requirement, manufacturing will be carried out using these process parameters. If the deviation is not less than the threshold, the method 300 proceeds to block 306.

At block 306, a variation of at least one parameter associated with the glass bending process is computed based at least partly on the deviation of the real shape from the desired shape. For example, the parameter may be at least one position parameter of the glass at an entrance of a heating furnace, such as a rotation angle and/or translations of the glass. In addition, the parameters may further include process parameters in the glass bending process, such as temperature, air speed and/or sagging time. In some embodiments, after the glass reaches the forming ring but before press-fit is performed with the upper mold, the glass is formed on the forming ring by the effect of gravity, where the gravity forming time is sagging time.

For example, contributions of respective parameters to the deviation may be decoupled to determine an effect of one or more parameters on the deviation (i.e., sensitivity of the deviation to one or more parameters). Based on the deviation and the effect of the one or more parameters on the deviation, a variation of the one or more parameters may be determined.

In some embodiments, the contribution of one or more parameters to the deviation is represented by a first function of the at least one parameter, a contribution of one or more further parameters to the deviation is represented by a second function of the one or more further parameters, and the deviation is a sum of the first function, the second function, and terms independent of the at least one parameter and the one or more further parameters. For example, as shown in Equation (5), the deviation $M_k$ is a sum of a function of the rotation angle, a function of translations and a term independent of the rotation angle and translations.

In some embodiments, the deviation is an affine function of the at least one parameter and one or more further parameters. For example, as shown in Equation (5), $M_k$ is an affine function of the rotation angle α, the X translation and the Y translation. As a result, determining the effect of the at least one parameter on the deviation includes determining at least one coefficient of the affine function about the at least one parameter.

In some glass bending processes, a mold is applied on the glass to bend the glass. In those embodiments, the effect of the respective parameters or the coefficient of the affine function of the respective parameters may be determined based on reference positions (e.g. positions or coordinates of a stud) used in measuring the deviation, slopes of a surface of the mold at the reference positions, measurement positions used in measuring the deviation, and slopes of the surface of the mold at the measurement positions. For example, the Equation (5) shows relations between the respective coefficients and corresponding variables.

In a roller bending process, the effect of the respective parameters may be determined through the following variables, including: a primary radius of the glass, reference positions used in measuring the deviation, measurement positions used in measuring the deviation, and a secondary radius of rollers in the roller bending process. For example, the effect of the at least one parameter may be determined based on the following variables, including: a primary radius of the glass, reference positions in measuring the deviation, and measurement positions in measuring the deviation.

A bending process has been introduced above in view of the mathematical model. However, a variation of parameters of the bending process may be determined using a machine learning method. For example, a relation between the deviation and parameters may be established through a machine learning model. In this way, the variation of parameters may be determined through a machine learning model, based on the deviation. The machine learning model may include a neural network, Support Vector Machine (SVM), Integrated Decision Tree (IDT) (e.g. a random forest and a boosting decision tree), and the like.

At block 308, parameters of the glass bending process are adjusted based on the variation to compensate for the deviation of the shape. For example, the variation may be added to the original parameters to determine the adjusted parameter values.

At block 310, the glass may be manufactured based on the adjusted parameters. For example, the glass bending process is applied based on the adjusted parameters. The formed glass may be provided to block 302 for further evaluation.

Figure 4:
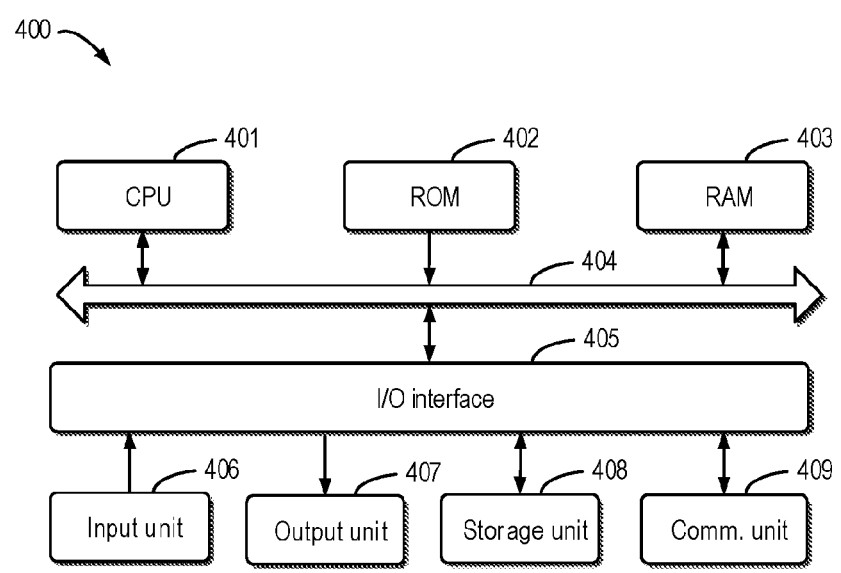
FIG. 4 illustrates a block diagram of a computing device according to some embodiments of the present disclosure.

FIG. 4 illustrates a schematic block diagram of a device 400 according to embodiments of the present disclosure. The method 300 as shown in FIG. 3 may be implemented by the device 400. The device 400 may receive measurement data from a measurement device and compute the adjusted glass bending parameters based on the measurement data.

As shown, the device 400 includes a central processing unit (CPU) 401 that can perform various appropriate acts and processing based on computer program instructions stored in a read-only memory (ROM) 402 or computer program instructions loaded from a storage unit 408 to a random access memory (RAM) 403. In the RAM 403, there further store various programs and data needed for operations of the device 400. The CPU 401, ROM 402 and RAM 403 are connected to each other via a bus 404. An input/output (I/O) interface 405 is also connected to the bus 404.

The following components in the device 400 are connected to the I/O interface 405: an input unit 406, such as a keyboard, a mouse and/or the like; an output unit 407, such as various kinds of displays and/or a loudspeaker, etc.; a storage unit 408, such as a magnetic disk, an optical disk, and/or etc.; a communication unit 409, such as a network card, a modem, and/or a wireless communication transceiver, etc. The communication unit 409 allows the device 400 to exchange information/data with other devices through a computer network such as the Internet and/or various kinds of telecommunications networks.

Various processes and processing described above, e.g., the method 300, can be executed by the processing unit 401. For example, in some embodiments, the method 300 can be implemented as a computer software program that is tangibly embodied on a machine readable medium, e.g., the storage unit 408. In some embodiments, part or all of the computer programs can be loaded and/or mounted onto the device 400 via ROM 402 and/or communication unit 409. When the computer program is loaded to the RAM 403 and executed by the CPU 401, one or more steps of the method 300 as described above can be executed. Alternatively, in other embodiments, the CPU 401 may be configured in any other appropriate manner to perform the method 300.

The present disclosure can be a method, a device, a system and/or a computer program product. The computer program product can include a computer readable storage medium on which computer readable program instructions are carried out for performing each aspect of the present application.

The computer readable storage medium may be a tangible device that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for glass bending comprising:
    obtaining a deviation of a real shape of a glass from a desired shape of the glass, the glass is produced by a glass bending process;
    determining a variation of at least one parameter associated with the glass bending process, at least in part based on the deviation of the real shape from the desired shape; and
    adjusting the at least one parameter based on the variation for compensation of the deviation,
    wherein determining the variation comprises
    determining an effect of the at least one parameter on the deviation by decoupling a contribution of the at least one parameter to the deviation from a contribution of one or more further parameters associated with the glass bending process to the deviation, and
    determining the variation based on the deviation and the effect of the at least one parameter,
    wherein the glass bending process comprises applying a mold on the glass, and wherein the effect of the at least one parameter on the deviation is determined based on following variables: reference positions used in measuring the deviation, slopes of a surface of the mold at the reference positions, measurement positions used in measuring the deviation, and slopes of the surface of the mold at the measurement positions; or
    wherein the glass bending process comprises a roller bending process, and the effect of the at least one parameter on the deviation is determined based on following variables: a primary radius of the glass, reference positions used in measuring the deviation, measurement positions used in measuring the deviation, and a secondary radius of rollers in the roller bending process; or
    wherein the glass bending process comprises a roller bending process, and the effect of the at least one parameter on the deviation is determined based only on following variables: a primary radius of the glass, reference positions used in measuring the deviation, and measurement positions used in measuring the deviation.

2. The method of claim 1, wherein the contribution of the at least one parameter to the deviation is represented by a first function of the at least one parameter, the contribution of the one or more further parameters to the deviation is represented by a second function of the one or more further parameters, and the deviation is a sum of the first function, the second function, and terms independent of the at least one parameter and the one or more further parameters.

3. The method of claim 1, wherein the deviation is an affine function of the at least one parameter and one or more further parameters, and wherein determining the effect of the at least one parameter on the deviation comprises:
   determining at least one coefficient of the affine function about the at least one parameter.

4. The method of claim 1, wherein the at least one parameter comprises at least one position parameter of the glass at an entrance of a furnace in the glass bending process.

5. The method of claim 4, wherein the at least one position parameter comprises at least one of a rotation angle and translations of the glass.

6. The method of claim 1, wherein the at least one process parameter comprises at least one of temperature, air speed, and sagging time.

7. The method of claim 1, wherein a relationship between the deviation and the at least one parameter is simulated by a machine learning model, the machine learning model comprises a neural network, Support Vector Machine (SVM), Integrated Decision Tree (IDT), and wherein determining the variation comprises:
   determining the variation based on the deviation by the machine learning model.

8. The method of claim 1, wherein when the deviation is less than a predefined shape tolerance, the method further comprises maintaining the at least one parameter without adjustment.

9. A method for producing a glass, comprising:
   applying a glass bending process based on at least one parameter to the glass;
   measuring a deviation of a real shape of the glass from a desired shape of the glass; and
   determining the adjusted at least one parameter by the method of claim 1.

* * * * *